United States Patent
Bjørkgård

(10) Patent No.: US 7,306,211 B2
(45) Date of Patent: Dec. 11, 2007

(54) COUPLING

(75) Inventor: Sven Bjørkgård, Kongsberg (NO)

(73) Assignee: Kongsberg Automotive ASA, Kongsberg (NO)

( * ) Notice: Subject to any disclaimer, the term of this patent is extended or adjusted under 35 U.S.C. 154(b) by 93 days.

(21) Appl. No.: 10/507,318

(22) PCT Filed: Mar. 10, 2003

(86) PCT No.: PCT/NO03/00082

§ 371 (c)(1),
(2), (4) Date: Sep. 10, 2004

(87) PCT Pub. No.: WO03/076218

PCT Pub. Date: Sep. 18, 2003

(65) Prior Publication Data

US 2005/0161872 A1 Jul. 28, 2005

(30) Foreign Application Priority Data

Mar. 12, 2002 (NO) .................................. 2002 1215

(51) Int. Cl.
B60G 11/22 (2006.01)
(52) U.S. Cl. .................... 267/293; 267/141; 267/279; 267/141.1; 384/215; 384/220; 403/225
(58) Field of Classification Search ............ 267/141.3, 267/141.1, 141, 153, 154, 279, 281, 273, 267/293; 280/124.156, 124.108, 124.11, 280/124.111, 124.116; 180/352; 384/215, 384/220, 222; 403/203, 220, 223, 225; 464/180

See application file for complete search history.

(56) References Cited

U.S. PATENT DOCUMENTS 2,607,617 A * 8/1952 Pringle ........................ 403/203

(Continued)

FOREIGN PATENT DOCUMENTS

DE 3536283 4/1987

(Continued)

*Primary Examiner*—Devon C. Kramer
*Assistant Examiner*—Mariano Sy
(74) *Attorney, Agent, or Firm*—Edwards Angell Palmer & Dodge LLP

(57) ABSTRACT

A coupling for resilient interconnection of two objects, especially a wheel axle housing and a chassis of a vehicle. The coupling comprises an elongated supporting piece (50), which extends in a longitudinal direction and two end attachment portions (52, 54) and a central portion (56). The coupling also comprises an elastic element (60), which is arranged around the central portion (56) and has an approximately cylindrical outer surface (64) and two end surfaces (68, 70). The coupling further comprises a first and a second abutment member (82, 84), where the first abutment member (82) has a bottom (90) and a tubular portion (86), which is fixed to the bottom (90) and has an open portion and a cylindrical inner surface (98). The bottom has a trough-going hole (106) through which one end attachment portion (52) can extend. The second abutment member (84) has a hole (108) through which the second end attachment portion (54) can extend. The abutment members (82, 84) are arranged to be interconnected in order to enclose the element. According to the invention the second abutment member (84) is designed in a similar manner to the first abutment member (82), end surfaces (94, 96) of the open end portions being arranged to abut against each other.

5 Claims, 4 Drawing Sheets

U.S. PATENT DOCUMENTS

| | | |
|---|---|---|
| 3,030,132 A | 4/1962 | Compton |
| 3,165,065 A * | 1/1965 | Stickel .................. 418/48 |
| 4,034,996 A | 7/1977 | Manita et al. |
| 4,671,694 A * | 6/1987 | Brenner et al. ............ 403/226 |
| 4,883,263 A * | 11/1989 | Buhl ..................... 267/293 |
| 5,340,220 A * | 8/1994 | Sprang et al. ............ 384/125 |
| 6,231,264 B1 | 5/2001 | McLaughlin |
| 6,305,699 B1 * | 10/2001 | Konig ................ 280/124.133 |
| 6,511,084 B1 * | 1/2003 | Buhl et al. ............ 280/124.107 |
| 6,719,476 B2 * | 4/2004 | Hisi ..................... 403/137 |
| 6,959,935 B2 * | 11/2005 | Buhl et al. ............ 280/124.11 |

FOREIGN PATENT DOCUMENTS

| | | |
|---|---|---|
| DE | 19952325 | 5/2000 |
| EP | 0684404 A1 | 11/1995 |
| EP | 1092891 A2 | 4/2001 |
| EP | 1103739 | 5/2001 |
| WO | WO 00/51833 | 9/2000 |

\* cited by examiner

COUPLING

BACKGROUND OF THE INVENTION

The invention relates to a coupling for resilient interconnection of two objects, especially a wheel axle housing and a chassis of a vehicle, comprising an internal coupling device comprising a supporting piece, which extends in an axial direction and has an axial supporting piece portion, a rubber-elastic element, which is arranged round the supporting piece portion and has an axially extending outer surface and two substantially radially extending end surfaces, and an external coupling device comprising two, approximately cup-shaped abutment members with a tubular wall portion and a bottom portion defining an inner portion of the abutment member, where each wall portion has an inner surface arranged to extend along and radially outside respective end portions of the outer surface of the element, the end of the wall portion facing away from the bottom has an end surface, and an inside of each bottom portion facing the inner portion of the abutment member are each arranged to abut against an end surface of the element for axial compression thereof, while the abutment members are pushed towards each other.

In U.S. Pat. No. 3,030,132 a coupling is disclosed where a body of a rubber-elastic material is cast between coupling devices or members during the actual assembly of the coupling. In order to ensure that the material is adequately compressed, during the casting process a recess is formed in the body while the cup members are kept at a correct distance apart. This is a laborious method, which is unsuitable for modern, fast serial production of vehicles. There is no indication of how a correct centring of the two cup members relative to each other is achieved during casting. A correct relative positioning of the cup members and the internal ball surface also seems to be important in order to ensure that the rubber-elastic material is not pinched between the cup members or that this material completely fills the space between the cup members and the interior ball surface 1. This is also important to ensure that the coupling obtains the correct spring characteristic.

U.S. Pat. No. 6,231,264 illustrates a bearing device for a torque rod where an intermediate sleeve may be provided inside eyelets forming end portions of arms. In the intermediate sleeve is provided a bearing sleeve. The eyelets are not arranged to provide an axial compression of the bearing sleeve. The intermediate sleeve is only provided in order to create an axially fixed connection between the bearing sleeve and the eyelets, since the intermediate sleeve may be axially secured to the bearing sleeve on one side and on the other side to the eyelets via snap rings. The function of the intermediate sleeve is not for centring the eyelets or for counteracting the penetration of material of the bearing device between the eyelets, and it has a row of circular grooves that weaken it.

In U.S. Pat. No. 5,649,719 an assembly is illustrated comprising a wheel axle housing and a chassis of a vehicle, and a coupling of the above-mentioned type for interconnecting the wheel axle housing and the chassis. FIG. 1 is a perspective view of the assembly, where components have been separated from one another, and FIG. 2 illustrates a longitudinal section through the coupling.

As illustrated in FIG. 1, a first end portion 6, 8 of two arms 2, 4 is each connected with a longitudinal frame beam 10 of a vehicle. Second end portions of each arm 2, 4 converge at a coupling 12 located above and in front of a wheel axle housing 14, connecting the arms 2, 4 to the wheel axle housing via a bracket 16.

As illustrated in FIG. 2, the coupling 12 comprises an internal coupling device with an elongated supporting piece 20 with end attachment portions 22, 24 via which the supporting piece can be attached to the wheel axle housing, and a central portion 26, which carries a rubber-elastic element 28.

The element 28 is radially enclosed by an external coupling device, which is fixed to the arms 2, 4 and comprises a first abutment member 30 with a bottom or shoulder 32, and a second abutment member 34, provided in the form of a ring. This ring 34 may be inserted in the first abutment member 30 and prevented from being moved out of it by means of a snap ring 36, which is arranged for insertion in a groove in the first abutment member 30. The shoulder 32 and the ring 34 are arranged to abut against respective opposite end portions 38, 40 of the element 28. In addition to the ring 34, the known coupling comprises an additional ring 42, which is arranged to abut against the shoulder 32, for extra support of the element 28 axially, i.e. in the supporting piece's longitudinal direction.

During operation the coupling is influenced by substantial forces in its longitudinal direction as well as in its transverse direction. There is therefore a need for extremely strong and hence expensive rings, which may have to be forged from steel. When the coupling is assembled, the element 28 is compressed axially by the ring 34 being forced axially by means of a separate tool in the direction of the shoulder 30 or the additional ring 42, whereupon the snap ring 36 is inserted in the groove by expanding radially therein. Compression stresses are thereby advantageously created in the element. During this process it is vital for the snap ring 36 to come into a correct engagement with the groove in order to ensure that the snap ring 36 will not be forced out of the groove under the influence of the highly fluctuating stresses on the coupling 12 during operation of the vehicle.

The object of the invention is to provide a coupling of the above-mentioned type, which is encumbered to a lesser extent by the above-mentioned drawbacks.

SUMMARY OF THE INVENTION

A coupling for resilient interconnection of two objects, especially a wheel axle housing and a chassis of a vehicle is provided, comprising an internal coupling device comprising a supporting piece, which extends in an axial direction and has an axial supporting piece portion, a rubber-elastic element, which is arranged around the supporting piece portion and has an axially extending outer surface and two substantially radially extending end surfaces, and an external coupling device comprising two, approximately cup-shaped abutment members with a tubular wall portion and a bottom portion defining an inner portion of the abutment member, where each wall portion has an inner surface arranged to extend along and radially outside respective end portions of the outer surface of the element, the end of the wall portion facing away from the bottom has an end surface, and an inside of each bottom portion facing the inner portion of the abutment member are each arranged to abut against an end surface of the element for axial compression thereof, while the abutment members are pushed towards each other, characterized in that between the wall portions and the element an axially extending sleeve is mounted for relative centering of the abutment members and for counteracting the penetration of portions of the element between the end surfaces of the wall portions during the axial compression of the element.

DETAILED DESCRIPTION OF THE INVENTION

Figure 1:
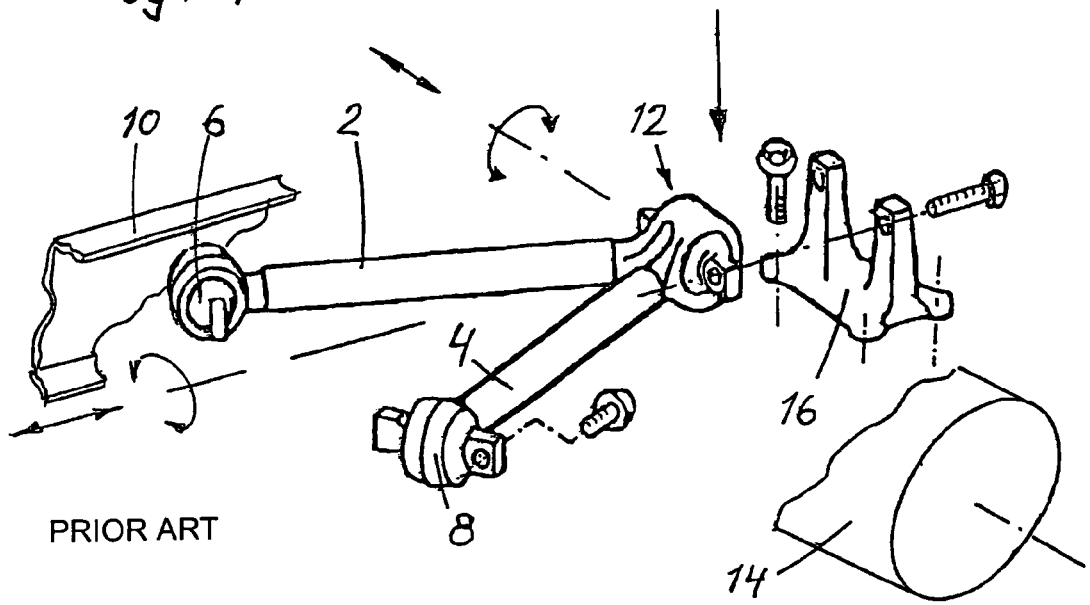
FIG. 1 is a perspective view of a conventional coupling for interconnecting a wheel axle housing and a chassis.
Figure 2:
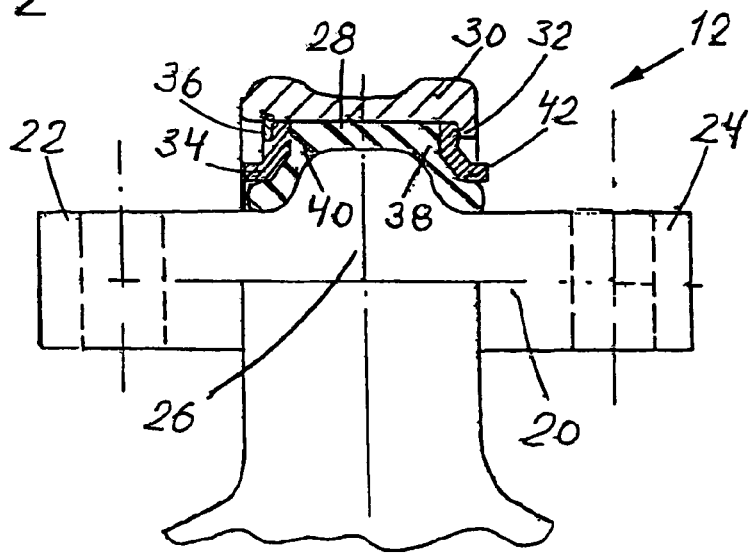
FIG. 2 is a longitudinal section through the coupling.

The invention will now be described in greater detail with reference to FIGS. 3-9, which schematically illustrate embodiments of the coupling according to the invention.

For the different embodiments of the coupling according to the invention, identical reference numerals are employed for corresponding components and portions.

Figure 3:
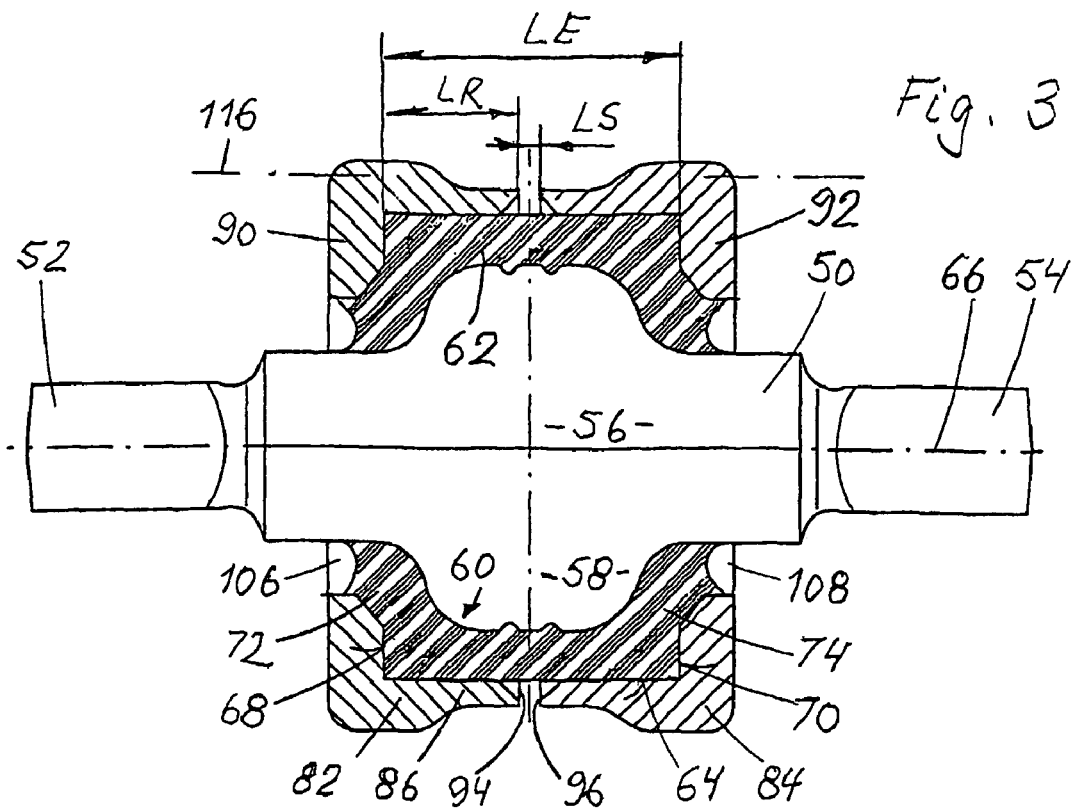
FIG. 3 illustrates a longitudinal section through a first embodiment of a coupling according to the invention, where two abutment members of the coupling rest against end portions of an elastic element, but do not compress it axially.
Figure 4:
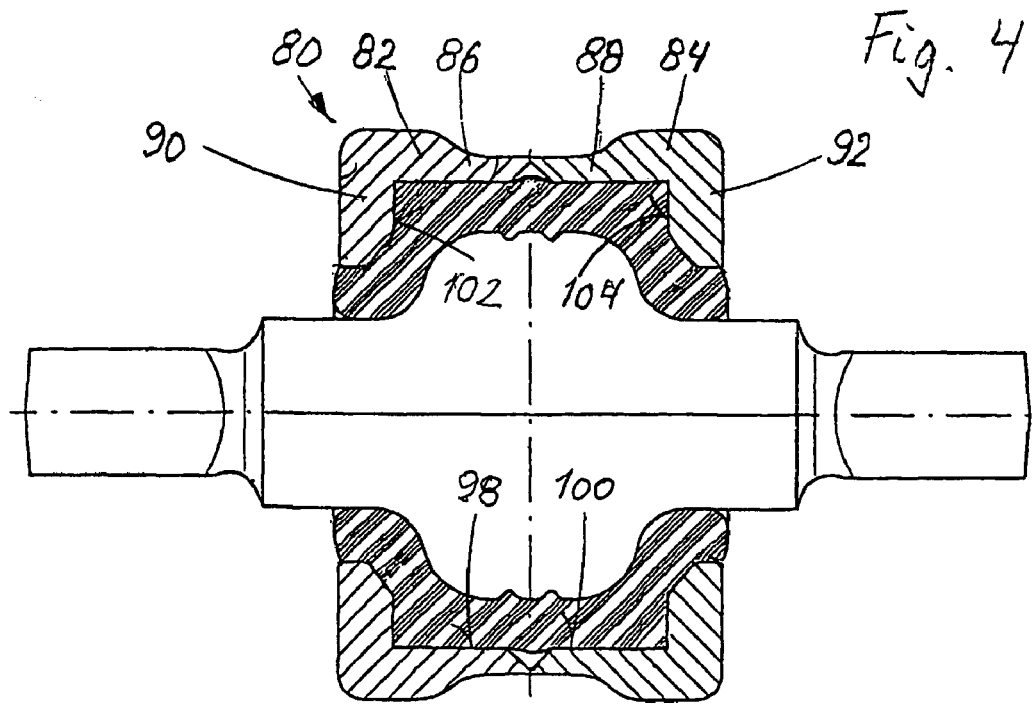
FIG. 4 illustrates a longitudinal section similar to that illustrated in FIG. 3, but where the element has been compressed and end surfaces of the abutment members abut against each other.

As illustrated in FIGS. 3 and 4 a first embodiment of a coupling according to the invention comprises an internal coupling device provided in the form of an elongated supporting piece 50 with two end portions or end attachment portions 52, 54, which are arranged for releasable, fixed connection with a wheel axle housing (not shown). The supporting piece 50 extends in a longitudinal direction and has a central portion or supporting piece portion 56, which is located between the end portions 52, 54 and may have a radial extension 58.

The supporting piece's central portion 56 carries a rubber-elastic element 60 provided approximately in the form of a sleeve, a central portion 62 thereof extending in the longitudinal direction having a cylindrical outer surface 64 with a cylindrical axis 66. The element has end surfaces 68, 70 facing axially away from each other and extending radially or conically from the ends of the cylindrical outer surface 64 towards the cylindrical axis 66. The element may also have two end flanges 72, 74, which similarly extend radially or conically towards the cylindrical axis 66, and which may comprise the end surfaces 68, 70. The extension 58 of the supporting piece may prevent an axial, relative motion of the supporting piece 50 and the element 60. Instead or in addition the element 60 may be attached to the supporting piece 50 in another way, e.g. by adhesion or vulcanising.

Radially outside the rubber-elastic element 60 an external coupling device 80 is provided comprising two abutment members 82, 84. These may be separate components that can be arranged to be attached to the respective arms 2, 4 (FIG. 1) via which the coupling is attached to the frame beams 10, or the abutment members 82, 84 and the arms 2, 4 may be manufactured in one piece, e.g. by forging.

The abutment members 82, 84 are substantially cup-shaped, having tubular wall or side portions or tubular portions 86, 88, one end portion of which is connected to respective end bottoms or bottoms 90, 92. The other end portion of the tubular portions 86, 88 is open and has end surfaces 94, 96. The tubular portions 86, 88 also have a cylindrical inner surface 98, 100, whose diameter is adapted to the diameter of the cylindrical outer surface 64 of the rubber-elastic element 60. The bottoms have an inside 102, 104, whose shape is adapted to suit the end surfaces 68, 70 of the element 60. Each bottom 90, 92 has a central hole 106, 108, whose diameter is preferably larger than the transverse dimension of the supporting piece's end portions 52, 54.

As illustrated in FIG. 3, the distance between the bottoms' inside 102, 104 and the respective end surfaces 94, 96 of the tubular portions 86, 88 is indicated by LR.

It is also clear from this figure that the distance LE between the end surfaces 68, 70 of the element 60 is greater than 2×LR, i.e. there is a gap with a width corresponding to LE−2×LR=LS between the tubular portions' end surfaces 94, 96 when the insides 102, 104 of the abutment portions' bottoms abut against the element's 60 end surfaces 68, 70.

Axially through the abutment members there are provided holes for screws 116 which are illustrated only by their centre lines in FIG. 3.

When assembling the coupling, the supporting piece's 50 end attachment portions 52, 54 are passed into the holes 106, 108 of the respective abutment members 82, 84 until the element's end surfaces 68, 70 come into abutment against the bottoms' respective insides 102, 104 as illustrated in FIG. 3. The screws 116 are then tightened until the abutment members' end surfaces 94, 96 come into abutment with each other. The element 60 is thereby deformed, and material thereof can be pushed out through the holes 106, 108.

Figure 5:
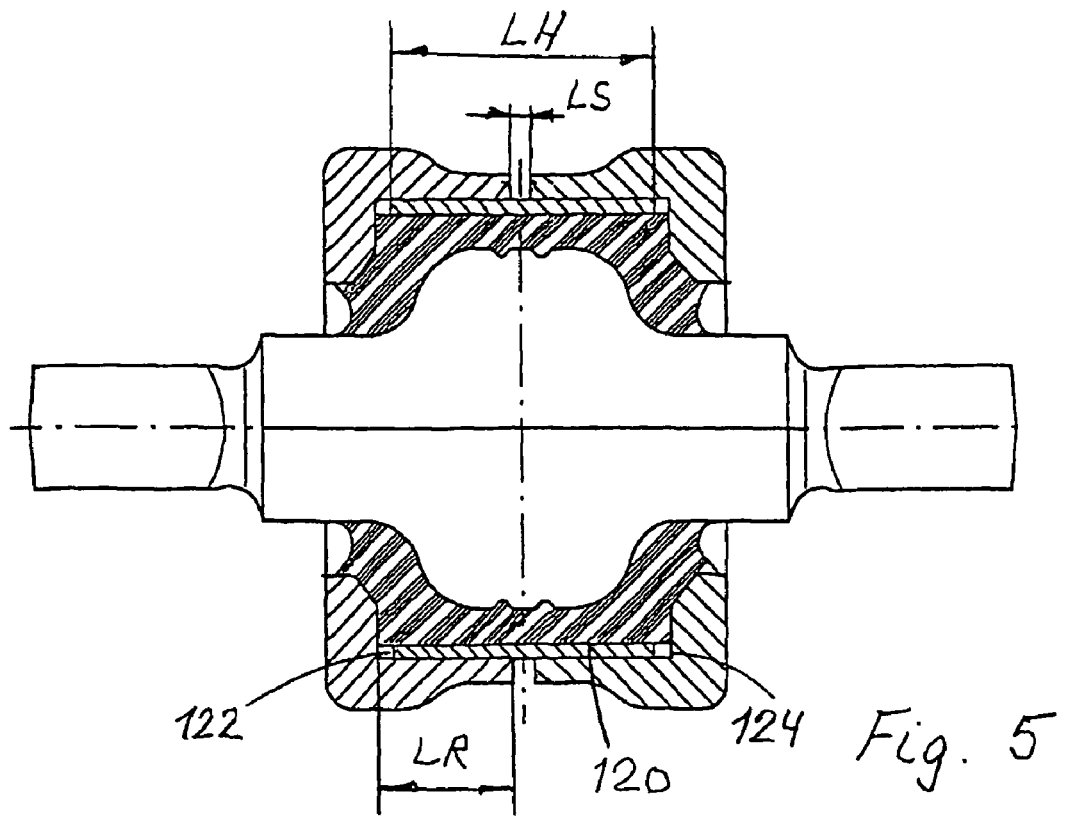
FIG. 5 illustrates a longitudinal section through a second embodiment of a coupling according to the invention, where a sleeve is mounted between the element and two abutment members of the coupling, and the abutment members rest against end portions of an elastic element, but do not compress it axially.
Figure 6:
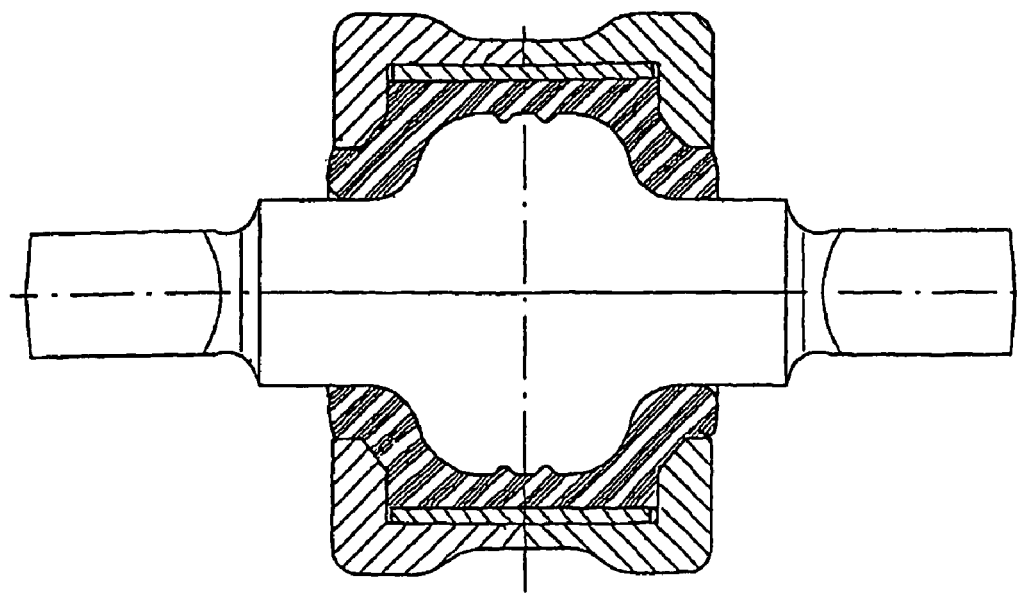
FIG. 6 illustrates a longitudinal section similar to that illustrated in FIG. 5, but where the element has been compressed and end surfaces of the abutment members abut against each other.

FIGS. 5 and 6 illustrate a second embodiment of a coupling according to the invention.

In the case of this coupling, between the bottoms 90, 92 of the abutment members 82, 84 and between the abutment members' cylindrical inner surfaces 98, 100 and the element's cylindrical outer surface 64 there is provided a tubular sleeve 120 with length LH. This length is slightly less than the total length of the abutment members' tubular portion 86, 88, i.e. LH<2×LR. There is therefore no danger that this sleeve 120 will be pinched between the bottoms 90, 92 when the abutment members' end surfaces 94, 96 abut against each other. When the element 60 is not compressed, an annulus 122, 124 is formed at the ends of the sleeve. This sleeve prevents the material of the element from becoming pinched between the abutment member's end surfaces 94, 96. By designing the sleeve with an appropriate length, the size of the annuli 122, 124 is adapted in such a manner that the material of the element can extend unhindered into the annuli 122, 124 without preventing the end surfaces 94, 96 from coming into abutment with each other.

Figure 7:
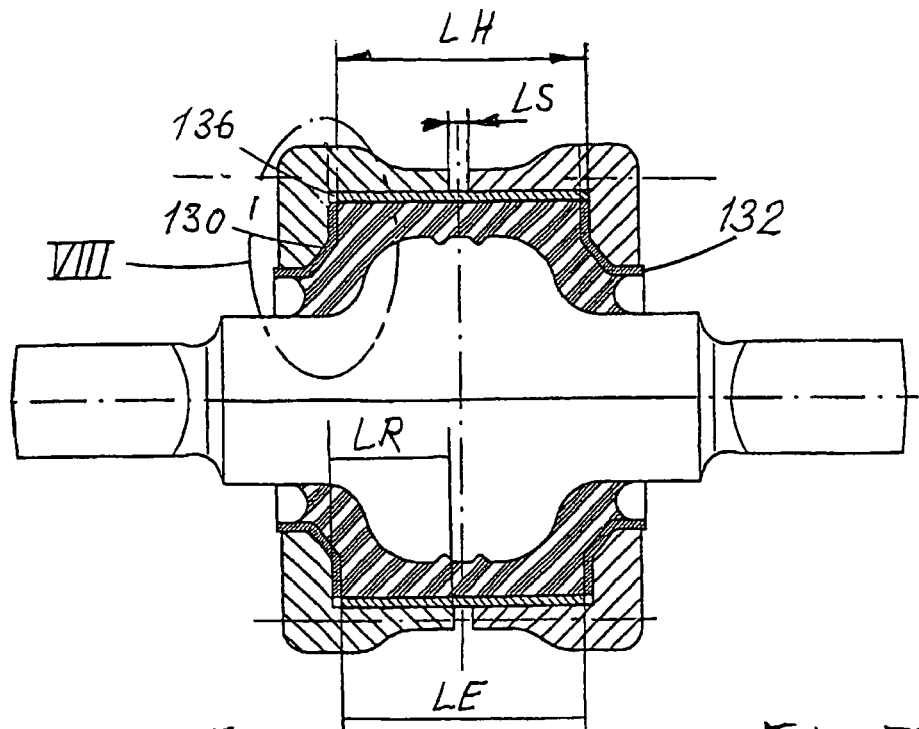
FIG. 7 illustrates a longitudinal section through a third embodiment of a coupling according to the invention, where a sleeve and two discs are mounted between the element and two abutment members of the coupling, where the abutment members of the coupling rest against end portions of an elastic element via the discs, but do not compress it axially.
Figure 8:
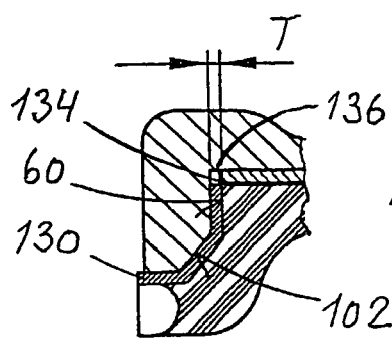
FIG. 8 illustrates the area indicated by VIII in FIG. 7 on a larger scale.
Figure 9:
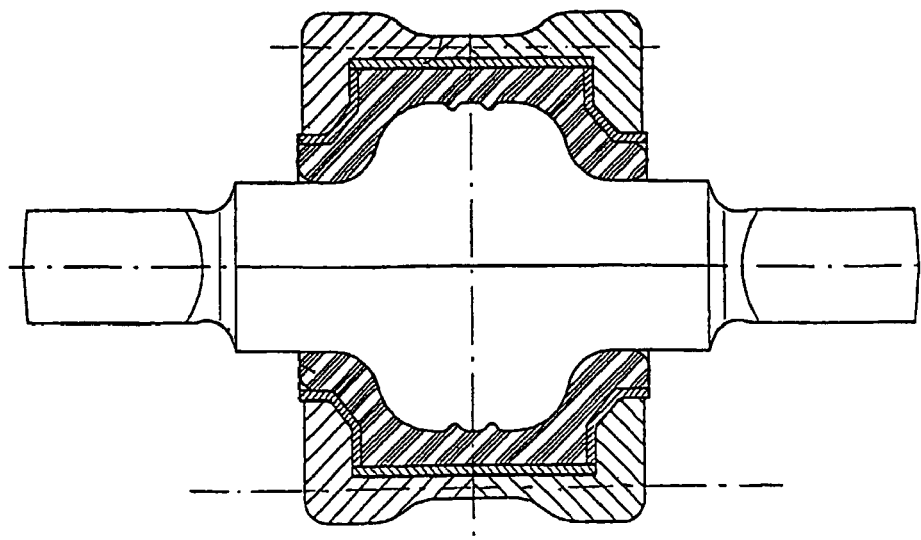
FIG. 9 illustrates a longitudinal section similar to that illustrated in FIG. 7, but where the element has been compressed and end surfaces of the abutment members abut against each other.

FIGS. 7-9 illustrate a third embodiment of a coupling according to the invention.

This embodiment resembles the embodiment according to FIGS. 5 and 6, but in this third embodiment an additional body is provided which may be in the form of a platelike disc or ring 130, 132, between the bottoms' insides 102, 104 and the respective opposite end surfaces 68, 70 of the element 60. The thickness of the disc near the sleeve 120 is indicated by reference letter T. The length of the sleeve can hereby be greater than the sum of the element's length and this disc thickness, i.e. LH>LE+T. In addition LH<2×LR can apply as previously. One end of the sleeve can thereby abut against the inside 104 of one bottom 92 and one disc 132, while simultaneously overlapping a portion of the opposite end surface of the other disc 130 at a point 134 according to FIG. 8 when the abutment members 82, 84 are not compressing the element 60. At the same time LS<T can apply.

When the abutment members are compressed during assembly of the coupling, the material of the element 60 is thereby prevented from penetrating and becoming pinched in the small annulus 136 that is defined by the sleeve 120, the disc 130 and the abutment member 82.

The sleeve 120 may be connected to the element 60 over the whole or part of its length. The relative positions of the sleeve and the element can thereby be guaranteed and the number of separate parts of the coupling reduced.

Since the discs 130, 132 are supported against the abutment members 82, 84, the discs can be manufactured much more cheaply than in the prior art by stamping a plate instead of forging. The invention permits the abutment members to be fabricated from light metal, since there is no need for a highly loaded groove to be manufactured for a snap ring. A typical thickness for the discs may be 2 mm. The sleeve also has an important function in that it ensures a relative centring of the abutment members during assembly. Even though it is stated above that the abutment members can be screwed together, with the result that there is no need for any extra tool such as a press for joining them, it will be appreciated that the abutment members may be interconnected by means of welding. A drawback with this solution is the difficulties that arise if element 60 has to be replaced.

The abutment members are preferably identical, but it will be understood that their dimensions may be different provided they can be interconnected and act as indicated above.

The coupling according to the invention is described above in connection with interconnection of a wheel axle housing and a chassis of a vehicle, but it will be understood that the coupling may be employed in any kind of device where two objects have to be interconnected, where they have a certain amount of relative freedom of movement with six degrees of freedom.

The invention claimed is:

1. A coupling for resilient interconnection of two objects, comprising:
    an internal coupling device having a supporting piece, which extends in an axial direction and has an axial supporting piece portion;
    a rubber-elastic element, which is arranged around the supporting piece portion and has an outer surface parallel to the axial direction and two end surfaces extending substantially radially to the axial direction; and
    an external coupling device comprising two approximately cup-shaped abutment members, each member having a tubular wall portion and a bottom portion defining an inner portion of the abutment member, where each tubular wall portion has an inner surface arranged to extend along and radially outside a respective end portion of the outer surface of the rubber-elastic element, and an end of each tubular wall portion facing away from the bottom portion has an end surface, wherein the end surfaces of the tubular wall portions abut each other when the abutment members are pushed towards each other,
    wherein between the tubular wall portions and the rubber-elastic element, an axially extending sleeve is mounted for relative centering of the abutment members and for counteracting penetration of portions of the rubber-elastic element between the end surfaces of the tubular wall portions during axial compression of the rubber-elastic element.

2. The coupling according to claim 1, wherein between the inside wall of each bottom portion and each end surface of the rubber-elastic element, an annular disc is mounted.

3. The coupling according to claim 2, wherein the rubber-elastic element is securely connected to the annular discs.

4. The coupling according to any of claims 1, 2, or 3, wherein the rubber-elastic element is securely connected to the supporting piece.

5. The coupling according to claim 1, wherein the sleeve is securely connected to the rubber-elastic element over the whole or a part of its length.

* * * * *